United States Patent
Larker

(10) Patent No.: US 8,192,561 B2
(45) Date of Patent: Jun. 5, 2012

(54) METHOD FOR MANUFACTURING AT LEAST PART OF A DEVICE FOR AN EARTHMOVING OR MATERIALS-HANDLING MACHINE USING AUSTEMPERED DUCTILE IRON AND ITS NAMED PRODUCT

(75) Inventor: Richard Larker, Vindeln (SE)

(73) Assignee: Indexator Group AB, Vindeln (SE)

( * ) Notice: Subject to any disclaimer, the term of this patent is extended or adjusted under 35 U.S.C. 154(b) by 253 days.

(21) Appl. No.: 12/519,198

(22) PCT Filed: Dec. 17, 2007

(86) PCT No.: PCT/SE2007/051013
§ 371 (c)(1),
(2), (4) Date: Dec. 23, 2009

(87) PCT Pub. No.: WO2008/076067
PCT Pub. Date: Jun. 26, 2008

(65) Prior Publication Data
US 2010/0111662 A1    May 6, 2010

(30) Foreign Application Priority Data

Dec. 16, 2006  (SE) ....................................... 0602736
May 29, 2007  (SE) ....................................... 0701325

(51) Int. Cl.
C22C 37/00 (2006.01)
C22C 37/04 (2006.01)
C21D 5/00 (2006.01)
C21D 5/04 (2006.01)

(52) U.S. Cl. ........ 148/321; 148/545; 148/547; 148/548; 148/612; 148/614; 148/618; 148/663

(58) Field of Classification Search .................. 148/543, 148/544, 612–618, 321–323, 545, 547, 548, 148/663; 420/8–33
See application file for complete search history.

(56) References Cited

U.S. PATENT DOCUMENTS
3,549,430 A    12/1970  Kies et al.
(Continued)

FOREIGN PATENT DOCUMENTS
EP        0203050    11/1986
(Continued)

OTHER PUBLICATIONS

Machine-English translation of Japanese patent 2001-303167, Tanaka Yuichi et al., Oct. 31, 2001.*

(Continued)

*Primary Examiner* — Deborah Yee
(74) *Attorney, Agent, or Firm* — Young & Thompson

(57) ABSTRACT

Method for manufacturing at least one part of a device for mounting directly or indirectly on an arm of an earth-moving or material-handling machine, such as an excavator, tractor, harvester, forwarder or crane, whereby the device enables coupling and/or positioning (tilt and/or turn) of a tool (14), such as a bucket, grapple, fork, vibratory compactor or harvesting head, relatively to the arm of the machine. The method includes the steps of: a) forming a melt including unalloyed or alloyed ductile iron, b) casting at least one part of a device from the melt, c) allowing the at least one part of the device to cool, d) austenitizing the at least one part of the device, e) quenching the at least one part of the device, f) austempering the at least one part of the device, and g) allowing the at least one part of the device to cool.

19 Claims, 6 Drawing Sheets

U.S. PATENT DOCUMENTS

| | | | |
|---|---|---|---|
| 3,860,457 | A | 1/1975 | Vourinen et al. |
| 4,666,533 | A | 5/1987 | Kovacs et al. |
| 4,737,199 | A | 4/1988 | Kovacs |
| 4,880,477 | A | 11/1989 | Hayes et al. |
| 5,043,028 | A | 8/1991 | Kovacs et al. |
| 5,064,478 | A | 11/1991 | Kovacs et al. |
| 5,082,507 | A | 1/1992 | Curry |
| 5,139,579 | A | 8/1992 | Kovacs et al. |
| 5,248,354 | A | 9/1993 | Tada et al. |
| 5,522,949 | A | 6/1996 | Widmer et al. |
| 5,753,055 | A | 5/1998 | Liu |
| 5,837,069 | A | 11/1998 | Deards et al. |
| 5,878,897 | A | 3/1999 | Lazzaro et al. |
| 6,258,180 | B1 | 7/2001 | Wilde et al. |
| 6,861,029 | B2 | 3/2005 | Menk et al. |
| 6,939,414 | B2 | 9/2005 | Menk |
| 2001/0035291 | A1 | 11/2001 | Kirk et al. |
| 2004/0112479 | A1 | 6/2004 | Druschitz et al. |
| 2006/0157160 | A1 | 7/2006 | Druschitz et al. |

FOREIGN PATENT DOCUMENTS

| | | |
|---|---|---|
| EP | 0 217 498 A1 | 4/1987 |
| EP | 0 217 498 B1 | 4/1987 |
| EP | 0968868 | 1/2000 |
| GB | 2133805 | 8/1984 |
| JP | 401056819 * | 3/1989 |
| WO | WO 84/02924 A1 | 8/1984 |
| WO | WO 99/14382 A1 | 3/1999 |
| WO | WO 2004/022792 A2 | 3/2004 |

OTHER PUBLICATIONS

English-hand translation of Japanese patent 64-056819 A, Masajiro Kato et al., Mar. 3, 1989.*

International search report in corresponding PCT/SE2007/051013, dated Apr. 7, 2008.

Eduard Dorazil, "High strength austempered ductile cast iron", Ellis Horwood series in metals and associated materials, 1991.

V.E. Fierro et al., Fractomechanical Properties of As-Cast and Austempered SG Cast Iron Between −40° C. and +20° C., Materials Research, 2002, pp. 137-141, vol. 5, No. 2.

M. Gagne, "The Influence of Manganese and Silicon on the Microstructure and Tensile Properties of Austempered Ductile Iron", AFS Transactions, pp. 801-812.

J. Mallia et al., "Effect of silicon content on impact properties of austempered ductile iron", Materials Science and Technology, May 1997, pp. 408-414, vol. 13.

J. Mallia et al., "Effect of silicon content on transformation kinetics of austempered ductile iron", Materials Science and Technology, May 1998, pp. 452-460, vol. 14.

Yan Mi, "Effect of Cu, Mo, Si on the Content of Retained Austenite of Austempered Ductile Iron", Scripta Metallurgica e Materialia, 1995, pp. 1313-1317, vol. 32, No. 9, Elsevier Science Ltd.

H. Nieswaag et al., "Influence of Silicon Bainite Transformation in Ductile Iron; Relation to Mechanical Properties", Mat. Res. Soc. Symp. Proc., 1985, vol. 34, Elsevier Science Publishing Co., Inc.

P.J.J. Ratto et al. "Low Temperature Impact Tests in Austempered Ductile Iron and Other Spheroidal Graphite Cast Iron Structures", ISIJ International, 2001, pp. 372-380, vol. 41, No. 4.

R.E. Smallman et al., "Variation of silicon content and microstructure in austempered ductile iron (ADI)", Proceedings of the Third International Workshop on Materials Science (IWOMS '99), Nov. 2-4, 1999, pp. 70-73.

R.C. Thomson et al., "Modelling microstructural evolution and mechanical properties of austempered ductile iron", Materials Science and Technology, Nov.-Dec. 2000, pp. 1412-1419, vol. 16.

K.G. Valkov et al., "Silicon & Heat Treatment Parameters Effects on Austempered Ductile Iron Structure and Mechanical Properties", 34th MWSP Conf. Proc., ISS-AIME, 1993, pp. 341-349, vol. XXX.

M.A. Yescas et al., "Estimation of the amount of retained austenite in austempered ductile irons using neural networks", Materials Science and Engineering A311, 2001, pp. 162-173, Elsevier Science B.V.

"Spheroidal graphite cast irons—Classification", International Standard, ISO 1083, 2004, pp. i-32.

"Founding—Ausferritic spheroidal graphite cast irons—Classification", International Standard, ISO 17804, 2005, pp. i-32.

* cited by examiner

METHOD FOR MANUFACTURING AT LEAST PART OF A DEVICE FOR AN EARTHMOVING OR MATERIALS-HANDLING MACHINE USING AUSTEMPERED DUCTILE IRON AND ITS NAMED PRODUCT

TECHNICAL FIELD

The present invention concerns a method for manufacturing a device, such as a mechanically or hydraulically operated device, to be mounted directly or indirectly on the articulated arm of an earth-moving or material-handling machine, such as an excavator, tractor, harvester, forwarder or crane, to enable coupling and/or positioning (tilt and/or turn) of a tool, such as a bucket, grapple, fork, vibratory compactor or harvesting head, relatively to the arm of the machine. The present invention also concerns a device manufactured using said method and a machine comprising such a device.

BACKGROUND OF THE INVENTION

Earth-moving or material-handling machines, such as excavators, tractors, harvesters, forwarders or cranes, may be used in a large variety of applications such as for digging trenches, holes and foundations, demolishing buildings and other structures, landscaping, construction, mining and river dredging, harvesting and forwarding logs, lifting and placing objects etc. The versatility of such machines increases considerably when their tools can be rapidly changed and/or positioned by tilting and/or turning relative to their articulated arm. A mechanically or hydraulically operated device enabling one or several of these functions significantly enhances the productivity of the machine. The device for coupling and/or positioning (tilt and/or turn) has to be made from a material that possesses both strength, toughness and wear resistance in order to be able to withstand the significant mechanical stresses that it may be subjected to during the use of the machine with various tools.

Most of such devices are manufactured by welding several machined plates of steel together, followed by final machining. To reduce distortions caused by welding stresses, a stress relieving heat treatment is often necessary before final machining. Further, the device surfaces that come into contact with part of a tool or some other component, such as a gear or a bearing, when in use, may require local hardening or treatment to improve their wear resistance. Alternatively, some of the tribological requirements of the contact surfaces are satisfied by using softer and chemically different (i.e. compared to steel and iron) materials, such as bronzes, to avoid adhesive wear and seizure. However, this has several drawbacks: they cannot withstand high contact forces without continuing plastic deformation after initial running in and thus have to be replaced periodically. They may also be problematic to join to iron-based load-bearing structures.

It is often not economically feasible to manufacture steel devices by casting, especially if the devices are required to have a complex shape. This is because large risers (providing additional melt to castings as they solidify during cooling) are necessary to produce devices that are free of internal shrinkage voids, due to the large volume shrinkage in steel as it solidifies. Such large and numerous risers add cost and complexity to the device manufacturing process. To obtain sufficient mechanical properties in cast steel devices, hardening followed by tempering is necessary before final machining. A stress relieving heat treatment may also be necessary before final machining. Further, the device surfaces in contact with the tool may require local hardening to improve wear resistance.

The solidification shrinkage in ductile iron castings is less than half of that of steel castings, but in case of the device coupling interfaces in contact with the tool, ductile iron does often not have sufficient mechanical properties in the as-cast condition.

SUMMARY OF THE INVENTION

An object of the present invention is to provide an improved method for manufacturing at least one part of a device for coupling and/or positioning (tilt and/or turn) of tools, to be mounted directly or indirectly on an articulated arm or non-articulated arm of an earth-moving or material-handling machine, such as an excavator, tractor, harvester, forwarder or crane, whereby the use of the at least one manufactured part of the device part in an earth-moving or material-handling machine reduces the operating costs of the earth-moving or material-handling machine. The at least one part of the device may be releasably mounted on any part of an arm of an earth-moving or material-handling machine, such as the end of the arm, or may be fixedly attached to a part thereof. It should be noted that the device may also comprise part of the arm, whereby the device comprising part of the arm is mounted on another part, or the remaining part of an arm of an earth-moving or material-handling machine. Furthermore, the device may be a mechanically or hydraulically operated device.

This object is achieved by a method for manufacturing at least one part of a device for a mechanically or hydraulically operated coupling and/or positioning (tilt and/or turn) comprising the steps outlined in claim 1, namely the steps of:
 a) forming a melt comprising unalloyed or alloyed ductile iron,
 b) casting at least one part of a device from the melt,
 c) allowing the at least one part of the device to cool,
 d) austenitizing the at least one part of the device,
 e) quenching the at least one part of the device,
 f) austempering the at least one part of the device, and
 g) allowing the at least one part of the device to cool.

This method will result in the manufacture of a device or at least one device part comprising austempered ductile iron (ADI).

If manufacturing an entire device, the device may be mounted on the arm of an earth-moving or material-handling machine. If manufacturing one or more parts of a device, the device may be constructed using the manufactured part(s), for example by bolting the part(s) to another part or parts of the device, and then mounted on the arm of an earth-moving or material-handling machine.

Austempered ductile iron (ADI) possesses improved strength and ductility properties, as compared to conventional ductile iron, as a result of a heat treatment called "austempering". In a typical austempering heat treatment cycle a casting is firstly heated and then held at an austenitizing temperature until the casting becomes fully austenitic and the matrix becomes saturated with carbon. After the casting is fully austenitized, it is quenched in a salt bath at a quenching rate that is high enough to avoid the formation of pearlite (or solution strengthened ferrite) during the quenching. The casting is then held at temperature called the "austempering" temperature. After the isothermal austempering, the casting is cooled, to room temperature for example.

To accelerate the solution of carbon into austenite during austenitization, a substantially fully pearlitic as-cast microstructure is usually used as a precursor in the production of ADI in order to obtain short diffusion distances from high-carbon (cementite $Fe_3C$) to low-carbon (ferrite) areas. In a ferritic ductile iron, carbon has to diffuse several orders of magnitude further from the graphite nodules into the austenite matrix which is formed, requiring a considerably longer austenitizing time and/or a higher austenitizing temperature.

ADI castings are, compared to conventional ductile iron, at least twice as strong at the same ductility level, or show at least twice the ductility at the same strength level. Compared to steel castings of the same strength, the cost of casting and heat treating ADI is much lower. The superior mechanical properties of ADI emanate from an ausferritic microstructure of very fine needles of acicular ferrite in a matrix of austenite, thermodynamically stabilized by a high carbon content. The much higher silicon content in austempered ductile irons, compared to common steels, stabilizes carbon in graphite instead of cementite ($Fe_3C$), thus preventing the precipitation of carbides as long as the austempering is not too prolonged.

The at least one device part comprising of ADI therefore provides high strength, good fatigue properties, superior wear properties and excellent impact and fracture toughness, which make it ideal for use in an earth-moving or material-handling machine. The at least one device part comprising of ADI will consequently not have to be replaced as frequently as a device or device part made of steel, thereby reducing the operating costs of an earth-moving or material-handling machine in which the at least one device part comprising ADI is used.

ADI is also approximately 10% lighter than steel and is currently about 20% less expensive than steel of the same strength. Using at least one device part of reduced weight in an earth-moving or material-handling machine improves the maneuverability of the arm on which the at least one device part is mounted, it increases the lifting capacity and reduces the fuel consumption of the earth-moving or material-handling machine, making it more environmentally adapted and further reducing the operating costs of the earth-moving or material-handling machine.

According to an embodiment of the invention the method comprises the step of shaping at least one surface on the at least one part of the device during the casting process or during subsequent machining before ADI treatment, whereby the superficial material of the at least one surface in ADI subsequently undergoes a transformation to martensite when the at least one device part is in use, thus forming at least one wear resistant surface. Such a surface may be created on any part of the device that comes into contact with part of a tool, such as the corresponding part of a coupler, or with a gear, such as a spur gear, a helical gear, a bevel gear, a worm gear, a rack and pinion, or with a bearing, such as a sliding bearing, bushing, journal or thrust bearing, or with any other component when in use. When the at least one ADI device part is in use and the at least one surface is exposed to a high contact force, a strain-induced phase transformation occurs in the at least one surface of the at least one device part. The austenite matrix in the ausferrite in the at least one surface undergoes a transformation to martensite, which is harder and less close-packed, leading to compressive surface stresses on top of the remaining strong and ductile ausferrite structure in the core of the at least one device part, which remains unchanged. Wear-resistant surfaces may therefore be formed and regenerated in the parts of a device where they are needed the most during use. This unique property of ausferritic structures is more effective than common work hardening. No extra process step to provide a device or device part with wear-resistant surfaces is therefore necessary after the ADI device or device part has been cast and austempered, thus reducing manufacturing time, complexity and costs. The same transformation can also be beneficial in improving surface fatigue resistance by shot peening or ball burnishing.

According to an embodiment of the invention the method comprises the step of machining the at least one part of the device between step c) and step d), i.e. while the at least one part of the device still comprises as-cast unalloyed or alloyed ductile iron, before the treatment to form ADI. If ADI is machined, the above-mentioned phase transformation, which then occurs in front of the tool face, makes the material very difficult to machine. This problem is avoided by machining the cast ductile iron device or device part prior to austenitizing and austempering to form ADI. Alternatively or additionally, the component may be machined after the austempering step f), for example if some particular surface treatment is required or very close dimensional tolerances must be attained.

According to an embodiment of the invention the device comprises a coupler, or is constituted by a coupler. According to another embodiment of the invention the device comprises a means of rotating and/or tilting and/or linearly displacing said tool, such as a rotator or a tilt rotator.

According to an embodiment of the invention the method comprises the step of casting the device in a single piece.

According to an embodiment of the invention the method comprises the step of casting the at least one part of the device from an unalloyed or alloyed ductile iron with a silicon content of 3.35 weight-% to 4.60 weight-%.

There is a common misapprehension, that dates all the way back to the first ever patent on ductile iron (namely U.S. Pat. No. 2,485,760 published in 1949), that an increased silicon level makes ductile iron less ductile. However, this is only true when making an irrelevant comparison between a ferritic ductile iron solution strengthened by a high silicon content (i.e. a silicon content over 2.7 weight-%) and a much weaker conventional ferritic material, whereas the ferritic solution strengthened ductile iron is definitely more ductile when correctly compared to conventional ferritic-pearlitic material of similar strength. Furthermore, it has been found when comparing ductile irons of similar strength (500 MPa UTS), that the standard deviation in hardness is typically reduced from ±24 HBW-units (Brinell hardness value units) for the conventional ferritic-pearlitic material down to ±4 for the ferritic solution strengthened ductile iron, and that the machinability is improved by at least 20% due to the absence of the carbides in pearlite.

For example, the Standard Specification for Austempered Ductile Iron Castings (Designation: A 897M-06, published by the American Society for Testing and Materials (ASTM) on $3^{rd}$ Apr. 2006) states (on page 7, table X1.2) that silicon is one of the most important elements in ADI because it promotes graphite formation, decreases the solubility of carbon in austenite, increases the eutectoid temperature and inhibits the formation of bainitic carbide. It also warns that excessively high levels of silicon can suppress ausferrite in localized areas by stabilizing ferrite. The recommended amount of silicon is therefore given as 2.50%±0.20%. The heat treatment parameters (temperatures, hold times and cooling rates) are not specified in the standards, but in the scientific literature the emphasis has been on the effects of austempering, while the preceding austenitizing step has caught less attention. For conventional ADI with Si levels less than 3.35% the austenitizing temperature has usually not exceeded 900° C., and in the few attempts that have been made to austemper ductile irons with high silicon amounts between 3.35% Si and 4.60% Si, the austenitizing temperatures have been below 910° C.

The prevailing opinion in both scientific and patent literature on ADI is that neither a high silicon content (greater than 2.7 weight-%), nor a high austenitization temperature (i.e. a temperature greater than or equal to 910° C.) are beneficial, and that relatively large additions of copper, nickel and molybdenum are necessary for hardenability. On the contrary, it has been found that ADI having a high silicon content (i.e. 3.35 weight-% to 4.60 weight-%), which is austenitized at a high temperature (i.e. a temperature of at least 910° C.) and which contains little or no copper, nickel or molybdenum has several advantages over conventional ADI. There are namely improvements in both the ADI's thermal treatment performance and mechanical properties.

Without wishing to be bound by any theory it would seem that the unusually high silicon level increases nodularity and nodule density during the casting of the ductile iron. No expensive metallic hardenability additions of copper, nickel and molybdenum may be necessary, even when casting relatively thick components, which decreases manufacturing costs. The hardenability additions are usually not necessary since the high silicon level provides an improved hardenability by delaying pearlite formation during cooling from the austenitization temperature to the austempering temperature, whereby the pearlite formation would otherwise weaken the microstructure. Further, in even thicker castings the microstructure produced in the core will be solution strengthened ferrite instead of pearlite, causing a lesser adverse affect on the ADI's mechanical properties.

The base composition also exhibits significantly better machinability due to the ferritic structure that is solution-strengthened by silicon. Conventional pearlitic and ferritic-pearlitic microstructures are more abrasive on tools and exhibit substantial variations in strength and hardness throughout the microstructure thereof, which makes it very difficult to optimize machining parameters and achieve narrow geometric tolerances.

The increased silicon level further delays or completely prevents the formation of embrittling bainite (ferrite+cementite $Fe_3C$), thereby allowing complete isothermal transformation to ausferrite (acicular ferrite in a matrix of ductile austenite, thermodynamically stabilized by a high carbon level) during austempering. Thermodynamic stabilization and the amount of the austenite phase after austempering are improved due to the higher enrichment of carbon obtained at the higher austenitization temperature necessary for carbon to diffuse from graphite nodules in a reasonable time during austenitization of a ferritic matrix. An ADI having a silicon content of 3.35 weight-% to 4.60 weight-% also provides improvements in both strength and ductility compared to conventional ADI having a silicon content of 2.4-2.6 weight-%, due to the reduced segregation of mainly manganese and molybdenum, to the avoidance of the formation of embrittling carbides and to the increased amount of carbon in the stabilized austenite providing the ductile matrix.

According to an embodiment of the invention the unalloyed ductile iron has the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.1 |
| Ni | max 0.1 |
| Mo | max 0.01 |
| balance Fe and normally occurring impurities. | |

According to another embodiment of the invention the alloyed ductile iron has the following composition in weight-%:

| | |
|---|---|
| C | 3.0-3.6 |
| Si | 3.35-4.60 |
| Mn | max 0.4 |
| P | max 0.05 |
| S | max 0.02 |
| Cu | max 0.8 |
| Ni | max 2.0 |
| Mo | max 0.3 |
| balance Fe and normally occurring impurities. | |

According to an embodiment of the invention the method comprises the step of austenitizing the ductile iron at a temperature of at least 910° C. or at least 930°.

According to another embodiment of the invention the method comprises the step of maintaining the austenitization temperature for a predetermined time of at least 30 minutes, depending on silicon content, to austenitize the at least one part of the device. The predetermined time is increased with increasing silicon content. According to an embodiment of the invention the austenitizing step is carried out in a nitrogen atmosphere, argon atmosphere, a salt bath or any reducing atmosphere, such as a dissociated ammonia atmosphere to prevent the oxidation of carbon.

According to another embodiment of the invention the method comprises the steps of forming a melt comprising unalloyed or alloyed ductile iron with a silicon content of 3.35 weight-% to 4.60 weight-%, casting at least one part of a device from the melt, allowing the at least one part of the device to cool, heat treating at least one part of the at least one part of the device at a first temperature of at least 910° C. or at least 930° C. and holding the at least one part of the device at the temperature for a predetermined time to austenitize the at least one part of the device, and quenching at a quenching rate sufficient to prevent the formation of pearlite, such as at least 150° C./min. The expression "a predetermined time" in this step is intended to mean a time sufficient to heat the at least one part of the device that is to be austenitized, to the austenitizing temperature and to saturate the austenite with carbon to produce an ausferritic structure. The austenitizing may be accomplished using a high temperature salt bath, a furnace or a localized method such as flame or induction heating.

The at least one device part is then quenched in a salt bath, at a rate sufficient to prevent the formation of pearlite. The at least one device part is then austempered at a temperature between 250-400° C., preferably 350-380° C., and held at that temperature for a predetermined time, such as 30 minutes to two hours depending on section size, before being cooled to room temperature. The expression "a predetermined time" in this step is intended to mean a time sufficient to produce a matrix of ausferrite in the at least one part of the device. The austempering step may be accomplished using a salt bath, hot oil or molten lead or tin. The at least one part of the device is heated to a second temperature of 250-400° C., preferably 350-380° C., and held at that temperature for a predetermined time to austemper the at least one part of the device.

The present invention also concerns a mechanically or hydraulically operated device for mounting directly or indirectly on the articulated arm of an earth-moving or material-handling machine, such as an excavator, tractor, harvester, forwarder or crane, whereby the device enables coupling and/or positioning (tilt and/or turn) of a tool, such as a bucket, grapple, fork, vibratory compactor or harvesting head. At least one part of the device, or the entire device, is manufactured using a method according to any of the preceding claims.

According to an embodiment of the invention the at least one part of the device exhibits an ultimate tensile strength (UTS) of at least 900 MPa, preferably at least 1000 MPa and most preferably at least 1050 MPa.

According to another embodiment of the invention the at least one part of the device exhibits a yield strength of at least 600 MPa, preferably of at least 650 MPa, more preferably at least 750 MPa and most preferably at least 850 MPa.

According to a further embodiment of the invention at least one part of the device exhibits a fracture elongation of at least 9%.

According to an embodiment of the invention the device comprises a coupler, or is constituted by a coupler.

The present invention further concerns an earth-moving or material-handling machine comprising at least one arm and a mechanically or hydraulically operated device mounted directly or indirectly on the at least one arm, whereby the device is arranged to enable coupling and/or positioning (tilt and/or turn) of a tool, such as a bucket, grapple, fork, vibratory compactor or harvesting head, relatively to the at least one arm of the machine, whereby the earth-moving or material-handling machine comprises a device according to any of the embodiments of the invention. Such an earth-moving or material-handling machine is intended for use particularly, but not exclusively, in construction, mining, recycling, forestry, general cargo and materials handling.

BRIEF DESCRIPTION OF THE DRAWINGS

The present invention will hereinafter be further explained by means of non-limiting examples with reference to the appended figures where.

It should be noted that the drawings have not been drawn to scale, and that the dimensions of certain features have been exaggerated for the sake of clarity.

DETAILED DESCRIPTION OF EMBODIMENTS

Figure 1:
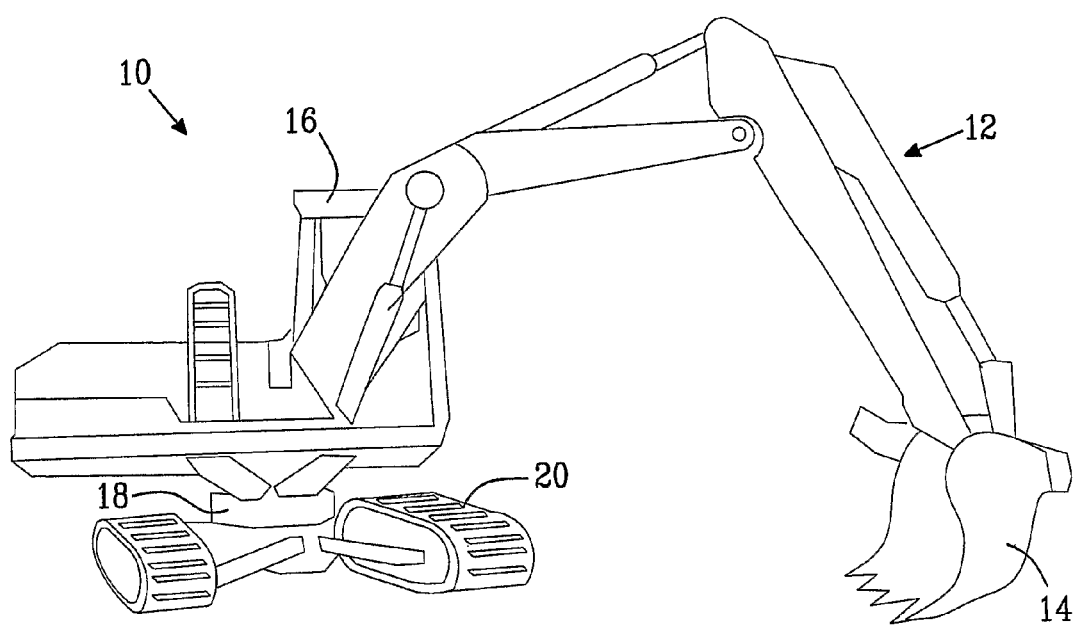
FIG. 1 shows an earth-moving machine, namely an excavator, according to an embodiment of the invention.

FIG. 1 shows an earth-moving machine 10, namely an excavator, comprising one articulated arm 12 to which a tool 14, namely a jawed bucket, is attached. The excavator 10 comprises a cabin 16 for an operator. The cabin 16 is mounted on a rotating platform 18 on top of an undercarriage with tracks 20. Movement of the tool 14 is electronically controlled from the cab 16 by an operator. Alternatively the excavator 10 may be operated remotely, if it is used in an environment that is hazardous for human beings for example. Such an excavator may weigh 3 to 30 tons or more.

Figure 2:
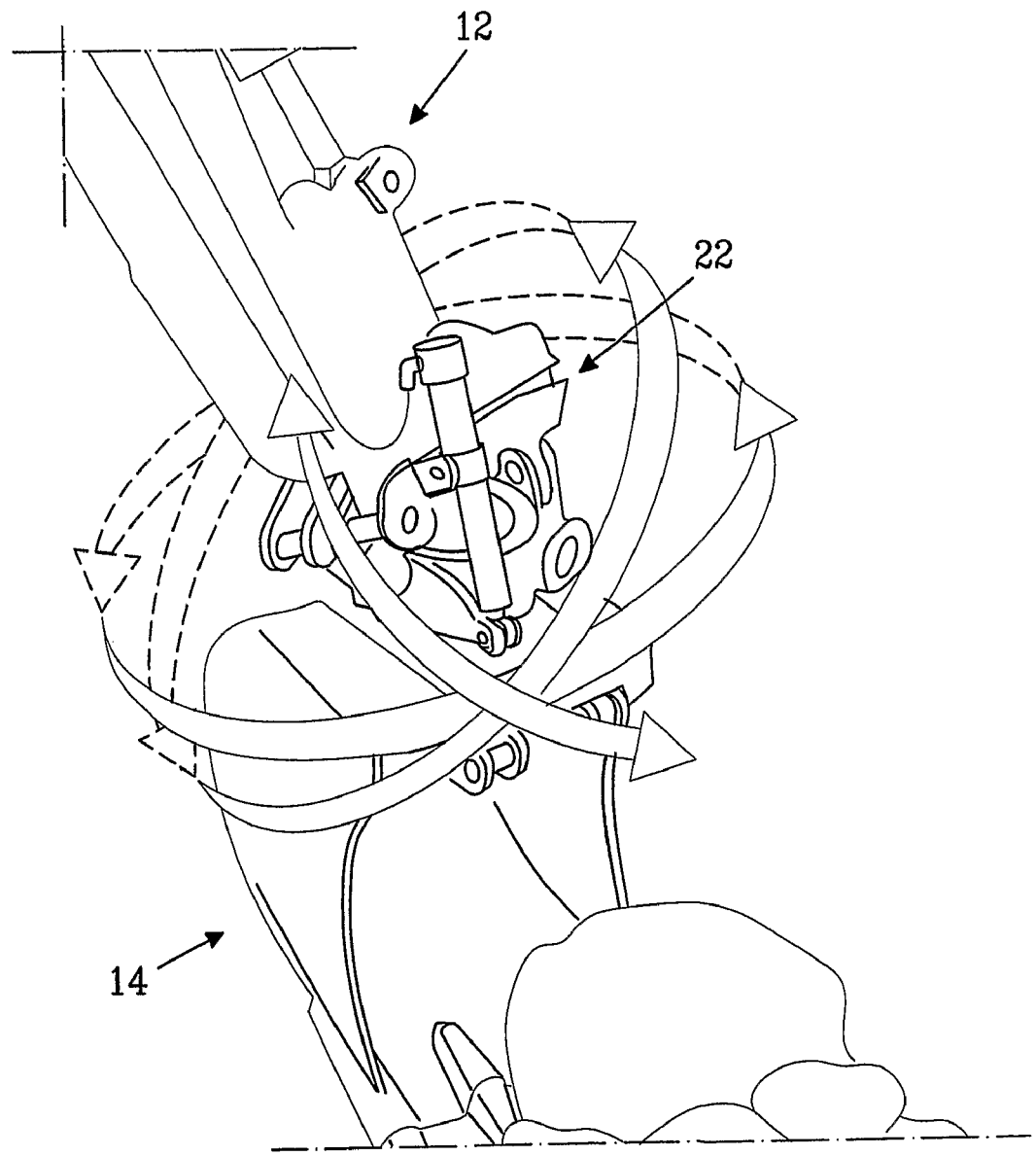
FIG. 2 shows an end of the articulated arm of an excavator comprising an embodiment of the invention, namely a device composed of a tilt rotator with a tool coupler.

The articulated arm 12 has a tool-bearing end as shown in FIG. 2. The tool 14 is attached to the end of the arm 12 via a device 22 composed of a tilt rotator with a tool coupler. The device 22 may be arranged to allow the tool 14 to tilt, for example through an angle of ±40°, and/or to rotate, for example through 360°, as indicated by the block arrows shown in FIG. 2. This facilitates the positioning of the tool 14 and the displacement of the tool 14 around, over or under an obstacle and thus improves the flexibility and precision of the excavator 10. The device 22 may be tilted and/or rotated by hydraulic cylinders and motors.

Figure 3:
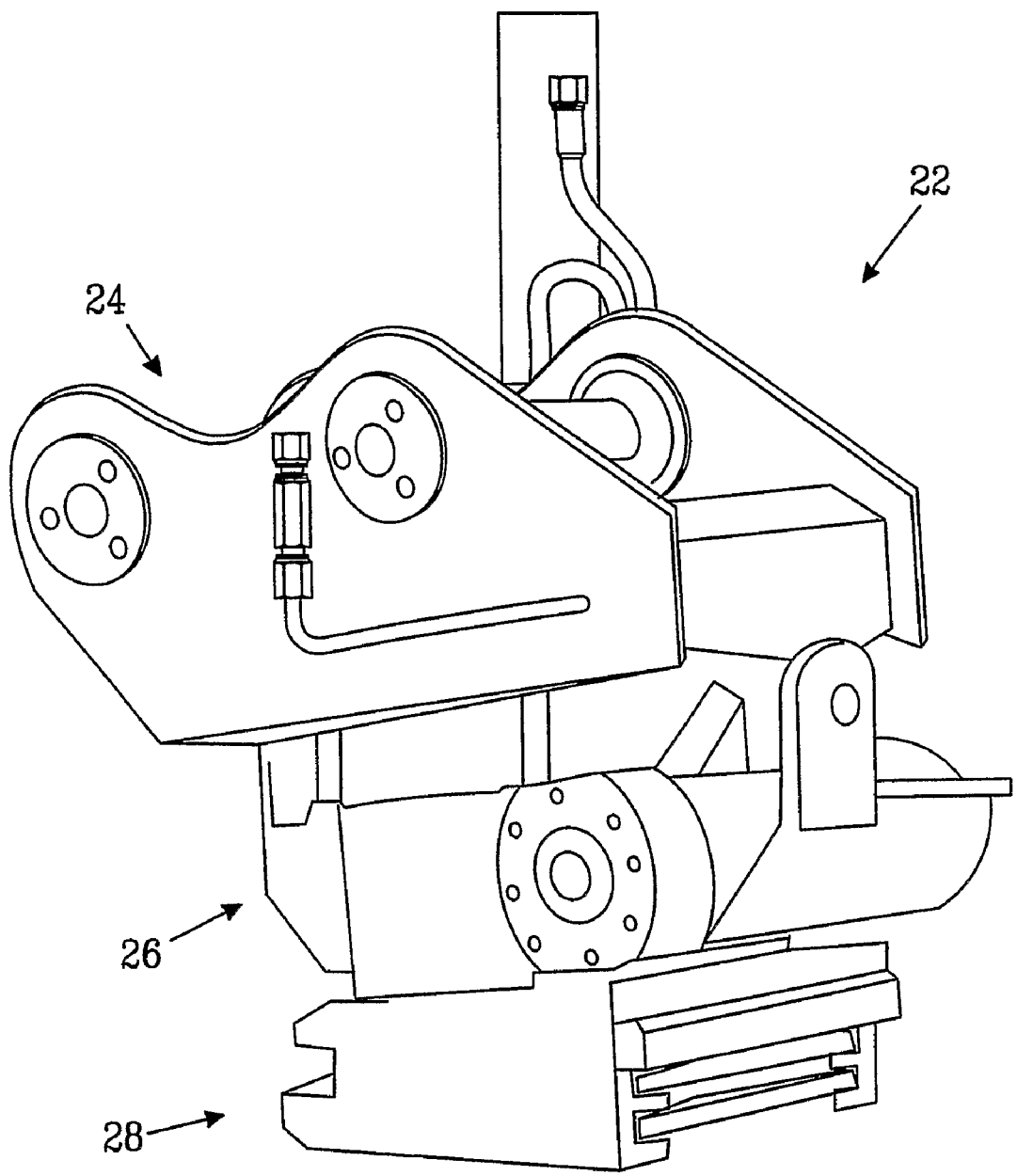
FIG. 3 shows an embodiment of the invention, namely a device composed of a tilt rotator with a tool coupler, for mounting at the end of the arm of an excavator.
Figure 4:
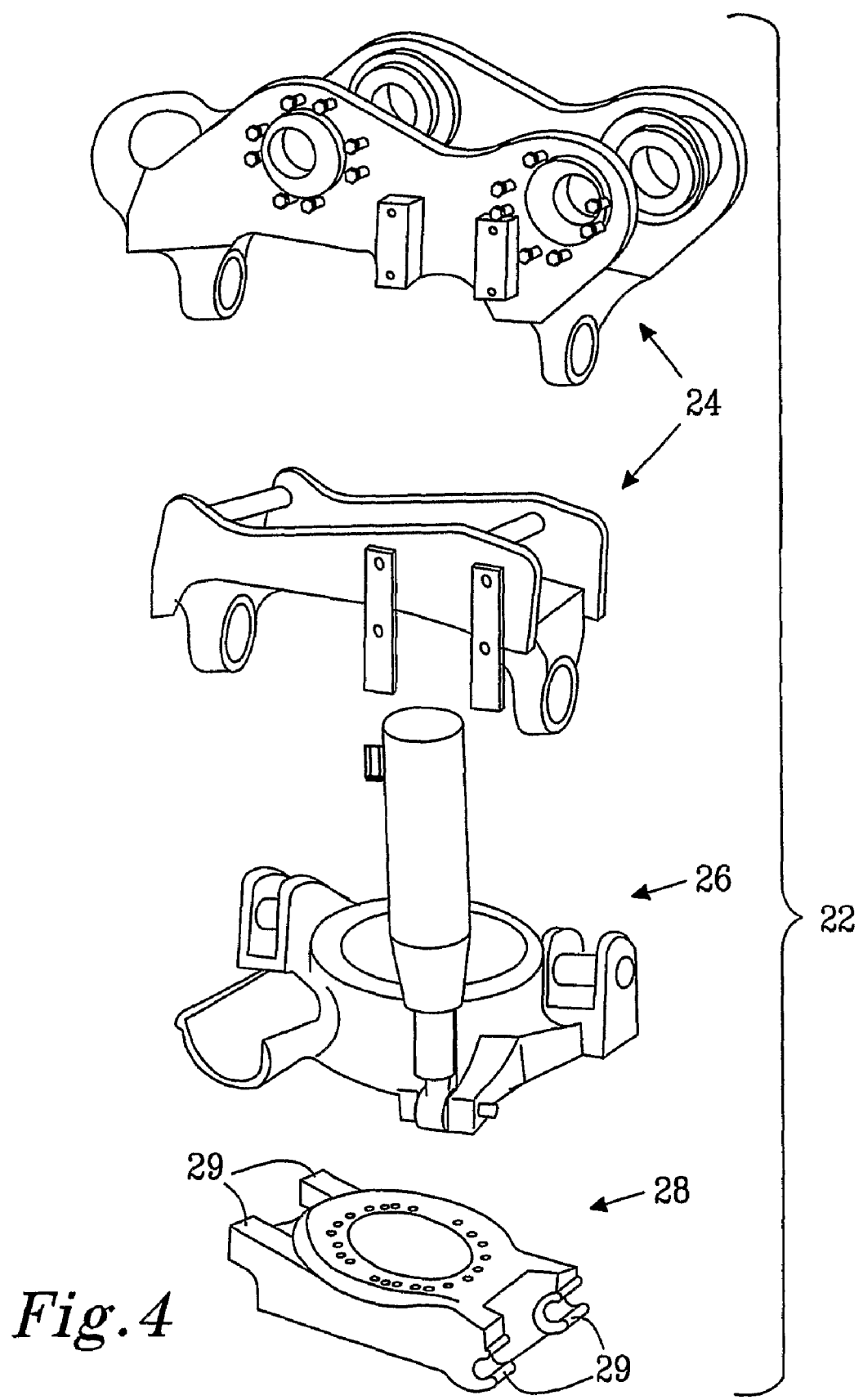
FIG. 4 shows an exploded view of the device shown in FIG. 3.

FIGS. 3 and 4 show the device 22 in a mounted state and in an exploded view respectively. The device 22 comprises an attachment 24 (in FIG. 4 alternative versions are shown for pin-on or coupler-equipped tool-bearing arm ends) for mounting the device 22 on the arm 12 of an excavator 10, and a rotor body 26 comprising a worm gear driven by a hydraulic motor, providing unlimited rotation in a clockwise or anticlockwise direction. It should be noted that a device according to an embodiment of the invention may comprise any means for providing rotation, tilting or linear displacement or any combination thereof. The hydraulic cylinder 25 provides tilting of the rotor body 26, for example through an angle of ±40°. The device 22 also comprises a coupler 28 to which a tool is attached. In accordance with one embodiment of the invention the structure of the coupler 28 is cast in a single piece out of ADI and has sockets for receiving mating parts of a tool 14.

The chemical composition of the ADI coupler 28 is, for example, about 3.4-3.8 weight-% carbon, 2.3-2.7 weight-% silicon, 0.3-0.4 weight-% manganese, a maximum of 0.015 weight-% sulphur and a maximum of 0.06 weight-% phosphorus. Depending on casting thickness, alloying elements such as up to 0.8 weight-% copper, up to 2.0 weight-% nickel, and up to 0.3 weight-% molybdenum may be added to the base composition during the casting of the coupler 28, to avoid the detrimental formation of pearlite in the core due to the less rapid cooling rate from the austenitization temperature to the austempering temperature.

The surfaces 29 of the sockets that comes into contact with mating surfaces of the tool 14 when the device 22 is in use become work hardened and wear-resistant. It should be noted that several, if not all of the parts of a device for coupling and/or positioning could be cast out of ADI, depending on working conditions in each specific case.

It should be noted that in some embodiments of the invention, the positioning (tilt and/or turn) functions may be excluded from the device 22, i.e. the device 22 may comprise only an attachment 24 for mounting it on the arm 12 of an excavator 10, and a coupler 28 for the tool 14. Furthermore, the attachment 24 and the coupler 28 may be manufactured in one piece as an integral unit.

Figure 5:
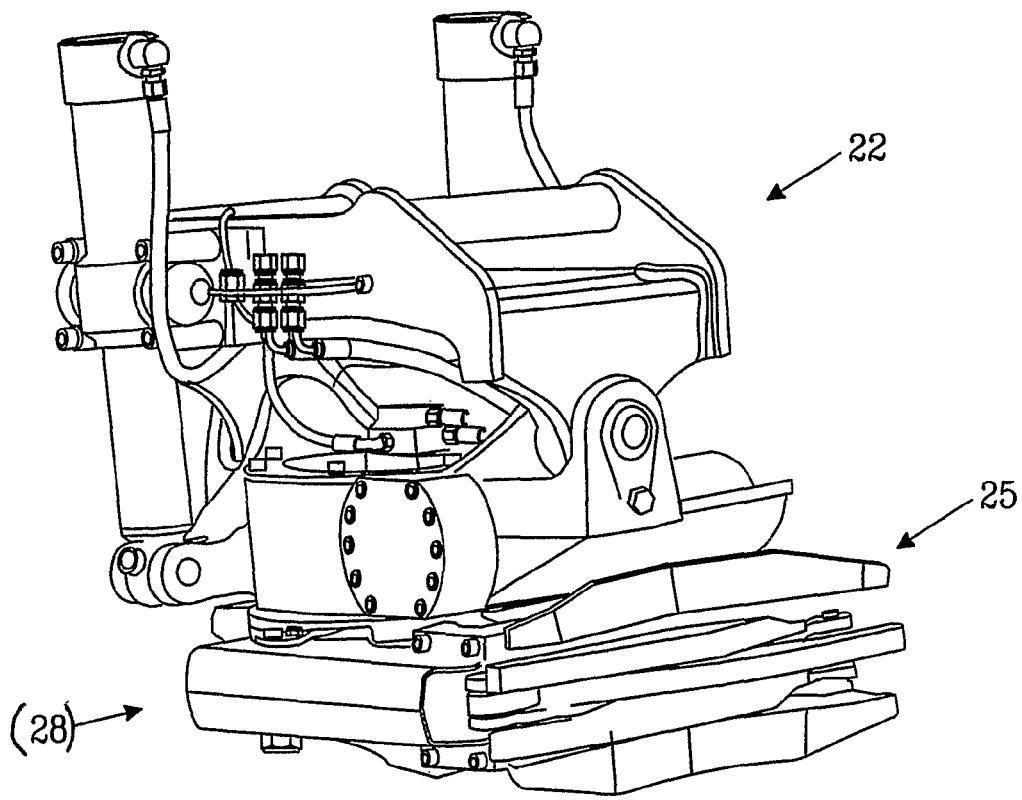
FIG. 5 shows a device according to an embodiment of the invention whereby the device comprises a grapple module manufactured from, or containing ADI.

FIG. 5 shows a device 22 according to an embodiment of the invention whereby the device, additionally to a tilt rotator with a coupler 28, also comprises a tool, namely a grapple module 25 mounted on the coupler 28 (that is hidden behind the grapple module in FIG. 5). The grapple module 25 is manufactured from, or contains ADI, and is arranged to grab and manipulate objects, such as pipes, logs, curb stones, without the need to replace the main tool, usually a bucket that is held by the coupler 28, with a separate grapple module.

Figure 6:
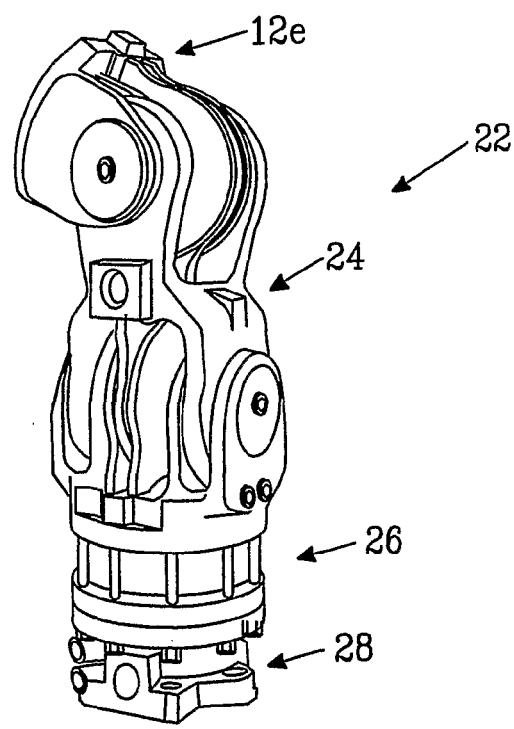
FIG. 6 shows another embodiment of the invention, namely a device comprising a rotator with a pendulum braked (swing damped) attachment (link), for mounting at the end of the arm of a material-handling machine.

FIG. 6 shows an embodiment of a device 22 for a material-handling machine. The device 22 comprises a rotator 26 driven by a hydraulic vane motor, providing unlimited rotation in a clockwise or anticlockwise direction, together with a pendulum braked (swing damped) attachment (link) 24, for mounting at the outermost part 12e of the arm of a material-handling machine. A tool, such as a grapple, bucket, fork or harvesting head may be attached to the coupler 28. It should be noted that a device according to any of the embodiments of the invention may be mounted anywhere on an arm of an earth-moving or material-handling machine, not necessarily at its end.

Figure 7:
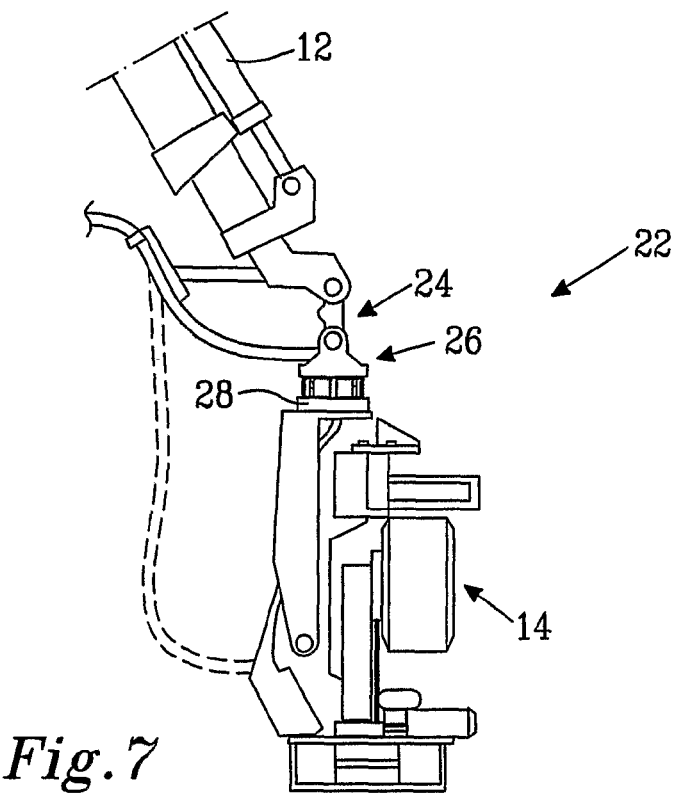
FIG. 7 shows an end of the articulated arm of a material-handling machine, namely a log harvester, comprising an embodiment of the invention, namely a device composed of a rotator with an attachment (link) to the outermost part of the arm and a coupler to the harvesting head.

FIG. 7 shows another embodiment of a device 22 for a log harvester. The device 22 comprises a rotator 26 located between an upper attachment (link) 24 and a coupler 28 between an arm 12 of a log harvester and a harvesting head 14.

Figure 8:
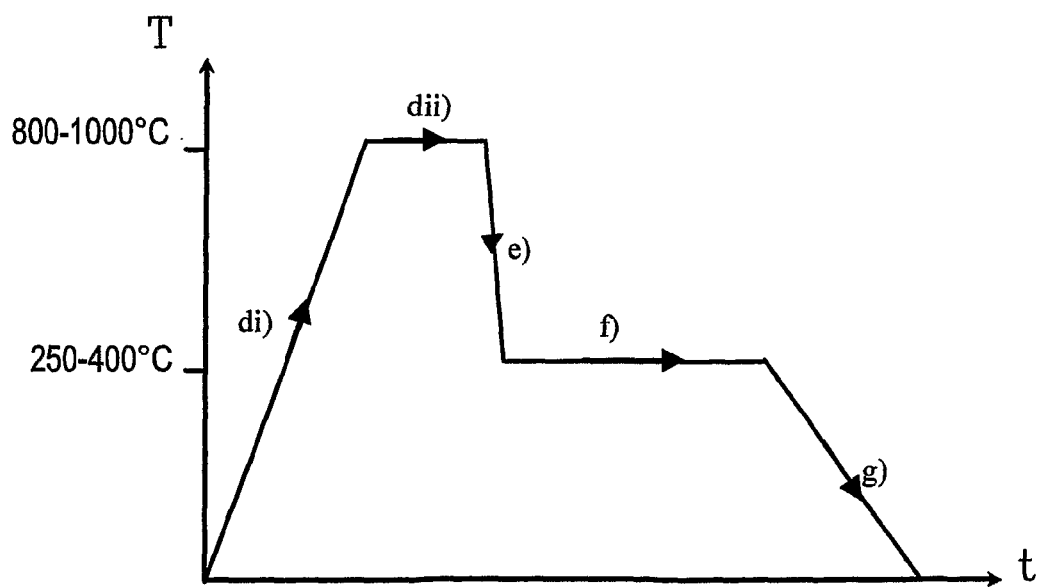
FIG. 8 shows a heat treatment cycle that is part of the method according to the invention.

FIG. 8 shows a heat treatment cycle that is part of the method according to the invention. The at least one part of a device made of unalloyed or alloyed ductile iron is heated [step di)] and held at an austenitizing temperature of between 800-1000° C. for a time [step dii)] until the at least one part of a device becomes fully austenitic and the matrix becomes saturated with carbon. After the at least one part of a device is fully austenitized, it is quenched at a high quenching rate [step e)], such as 150° C./min or higher in a quenching medium and held at an austempering temperature of between 250-400° C., [step f)]. After isothermal austempering, the at least one part of a device is cooled to room temperature [step g)]. The device thus made at least partially by ADI may then be mounted on an earth-moving or material-handling machine.

Further modifications of the invention within the scope of the claims would be apparent to a skilled person.

The invention claimed is:

1. A method for manufacturing at least one part of a hydraulically operated tilt rotator (22) or rotator (26) configured for mounting directly or indirectly on an arm (12) of an earth-moving or material-handling machine, the tilt rotator (22) or rotator (26) having been arranged to enable at least one of coupling, linear displacing or positioning by tilting or turning of a tool (14), and at least one surface (29) of said at least one part of the tilt rotator (22) or rotator (26) is arranged to make tribological contact with another component in the tilt rotator (22) or the rotator (26) or with a mating surface of said tool, when the tilt rotator (22) or rotator (26) is in use, the method comprising:
   a) forming a melt comprising unalloyed or alloyed ductile iron;
   b) casting at least one part of the tilt rotator (22) or the rotator (26) from said melt;
   c) allowing said at least one part of the tilt rotator (22) or the rotator (26) to cool;
   d) austenizing said at least one part of the tilt rotator (22) or the rotator (26);
   e) quenching said at least one part of the tilt rotator (22) or the rotator (26) to an austempering temperature;
   f) austempering said at least one part of the tilt rotator (22) or the rotator (26), thereby allowing complete isothermal transformation to ausferrite; and
   g) allowing said at least one part of the tilt rotator (22) or the rotator (26) to cool,
   wherein the surface material (29) of said at least one part undergoes a transformation to martensite when said at least one part of the tilt rotator (22) or the rotator (26) is subjected to a high contact force during use, thus forming and subsequently regenerating a wear resistant surface to avoid adhesive wear and seizure.

2. The method according to claim 1, wherein the method further comprises machining said tilt rotator (22) or rotator (26) between step c) and step d).

3. The method according to claim 1, wherein said tilt rotator (22) or rotator (26) comprises a coupler, or is constituted by a coupler.

4. The method according to claim 1, wherein said tilt rotator (22) or rotator (26) comprises a tool displacement mechanism configured for at least one of rotating, tilting or linearly displacing said tool (14).

5. The method according to claim 1, wherein step b) of the method comprises casting at least one part of the tilt rotator (22) or rotator (26) in a single piece.

6. The method according to claim 1, wherein the step a) includes forming said at least one part of the tilt rotator (22) or rotator (26) from an unalloyed or alloyed ductile iron with a high silicon content of 3.35 weight % to 4.60 weight %.

7. The method according to claim 6, wherein the step d) comprises austenitizing the ductile iron at a temperature of at least 910° C.

8. The method according to claim 6, wherein the steps a) through f) include:
   in the step a) forming the melt comprising unalloyed or alloyed ductile iron with a silicon content of 3.35 weight % to 4.60 weight %,
   in the step d) heat treating at least one part of said at least one part of the tilt rotator (22) or rotator (26) at a first temperature of at least 910° C. and holding said at least one part of the tilt rotator (22) or rotator (26) at said temperature for a time to austenitize said at least one part of the tilt rotator (22) or rotator (26),
   in the step e) quenching said at least one part of the tilt rotator (22) or rotator (26) at a quenching rate sufficient to prevent the formation of pearlite, or at least 150° C./min, and
   in the step f) heat treating said at least one part of the tilt rotator (22) or rotator (26) to a second temperature of 250-400° C., and holding said at least one part of the tilt rotator (22) or rotator (26) at said temperature for a predetermined time of at least 30 minutes to austemper said at least one part of the tilt rotator (22) or rotator (26).

9. A tilt rotator (22) or rotator (26) for mounting directly or indirectly on the arm (12) of an earth-moving or material-handling machine (10), the tilt rotator (22) or rotator (26) being arranged to enable at least one of coupling or positioning by tilting or turning of a tool (14) in relation to an arm of the machine, wherein at least one part of the tilt rotator (22) or rotator (26) has been manufactured by the method according to claim 1.

10. The tilt rotator (22) or rotator (26) according to claim 9, wherein said tilt rotator (22) or rotator (26) comprises a coupler, or is constituted by a coupler.

11. The tilt rotator (22) or rotator (26) according to claim 9, wherein said tilt rotator (22) or rotator (26) comprises a tool displacement mechanism configured for at least one of coupling, linear displacing or positioning by tilting or turning said tool (14).

12. An earth-moving or material-handling machine (10), comprising the tilt rotator (22) or rotator (26) according to claim 9.

13. The method according to claim 2, further comprising:
shaping at least one surface (29) on said at least one part of the tilt rotator (22) or rotator (26) during the casting of step b) or during machining before the austenizing of step d) whereby said at least one surface (29) having been shaped subsequently undergoes transformation to martensite.

14. The tilt rotator (22) or rotator (26) according to claim 10, wherein said tilt rotator (22) or rotator (26) further comprises a tool displacement mechanism for at least one of rotating, and/or tilting or linearly displacing said tool (14).

15. An earth-moving or material-handling machine (10), comprising the tilt rotator (22) or rotator (26) according to claim 10.

16. An earth-moving or material-handling machine (10), comprising the tilt rotator (22) or rotator (26) according to claim 11.

17. The method according to claim 1, wherein the earth-moving or material-handling machine is an excavator, tractor, harvester, forwarder or crane (10), and the tool (14) is a bucket, grapple, fork, vibratory compactor or harvesting head.

18. The tilt rotator (22) or rotator (26) according to claim 9, wherein the earth-moving or material-handling machine is an excavator, tractor, harvester, forwarder or crane (10), and the tool (14) is a bucket, grapple, fork, vibratory compactor or harvesting head.

19. The method according to claim 8 wherein the step F) of heat treating said at least one part of the tilt rotator (22) or rotator (26) is performed with the second temperature at 350-380° C.

* * * * *